June 14, 1960 A. CLAAS 2,940,383
BALING MACHINES
Filed April 15, 1958 2 Sheets-Sheet 1

Inventor:
AUGUST CLAAS
BY C. P. Goepel
his ATTORNEY

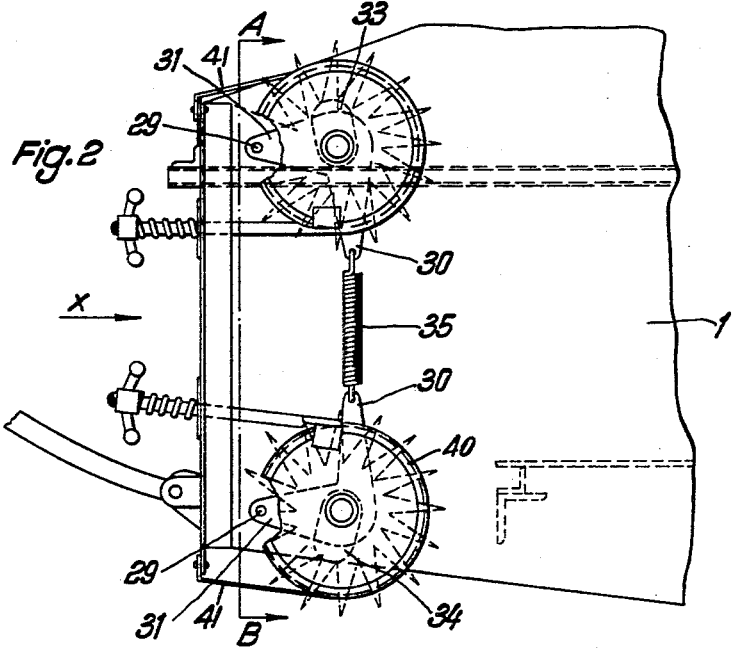
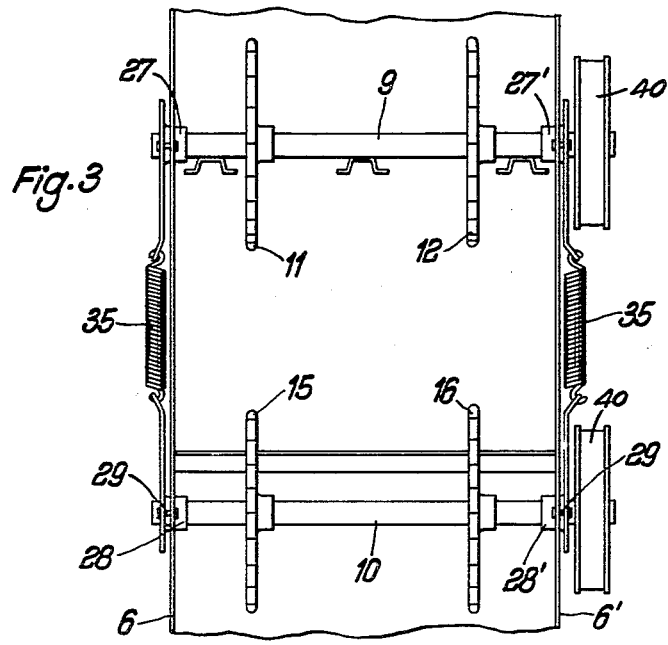

United States Patent Office 2,940,383
Patented June 14, 1960

2,940,383

BALING MACHINES

August Claas, 64 August-Claas-Strasse, Harsewinkel, Westphalia, Germany

Filed Apr. 15, 1958, Ser. No. 728,586

2 Claims. (Cl. 100—192)

This invention relates to baling machines for hay, straw and the like (hereinafter and in the claims referred to simply as "straw") and more particularly to improvements in the machine disclosed in my copending application, Serial No. 601,216, filed on July 31, 1956, for Baling Machines, now U.S. Patent No. 2,887,947, and the present application may be considered to be a continuation-in-part of said earlier application. The present invention is concerned with a braking device for the straw as it emerges in the form of bales from the outlet end of the baling chamber.

The arrangement of brake shafts and spur-wheels as disclosed in the aforementioned patent results in very strong compression of the bales. Consequently, the teeth of the spur-wheels penetrating the bales are subjected to considerable stresses since the solid bale offers considerable resistance to the action of the spur-wheels. The spur-wheels are therefore often damaged by breaking-off of individual teeth, and frequent bending of the brake shafts is a direct consequence of the undue strain.

An important object of the present invention is to obviate or mitigate this disadvantage.

According to the invention, the brake shafts are mounted in such a manner that the brake wheels can yield to excessive pressure.

The novel baling machine comprises a baling chamber having at the outlet end thereof a braking device comprising an upper and a lower brake shaft each of which is provided with wheels adapted to engage the baled straw and each being resiliently mounted.

The brake shafts are preferably mounted on levers carried for swivelling movement on the body of the baling chamber.

The levers for mounting the brake shafts are provided with two arms, so that one lever arm may be secured to the wall of the baling chamber and the other may be employed for attaching a spring thereto. The side walls of the baler or press carry bearing pins on which the levers are mounted, and a portion of each lever extends into slots formed in the side walls which limit the movements of the brake shafts in both the upward and in the downward directions. The spring arrangement acting upon the brake shafts may be fitted to the lever arms in such a manner that the shafts are resiliently mounted independently of each other.

In accordance with a further feature of the invention the free arm of each lever on the lower brake shaft is connected to the free arm of the aligned lever on the upper brake shaft by tensioned draw-spring. This ensures co-operation between the lower brake shaft and the upper brake shaft. If, for example, the lower side of the bale is more compressed than the upper side, the lower brake shaft tends to yield downwardly. This results in tensioning of the draw-springs which then act with a greater force upon the spur-wheels of the upper brake shaft. As the spur-wheels penetrate more deeply into the upper side of the bale, the latter is more firmly packed, so that, by the simultaneous effect of spring tension on both brake shafts, the lower and upper sides of the bale are compressed approximately to the same extent.

An embodiment of the invention will now be described, by way of example, with reference to the accompanying drawings, in which:

Fig. 2 is an enlarged side elevational view of the rear end of a straw-baler according to the present invention; and Fig. 3 is a section taken on the line A—B of Fig. 2 as seen in the direction of the arrow X.

Figure 1:
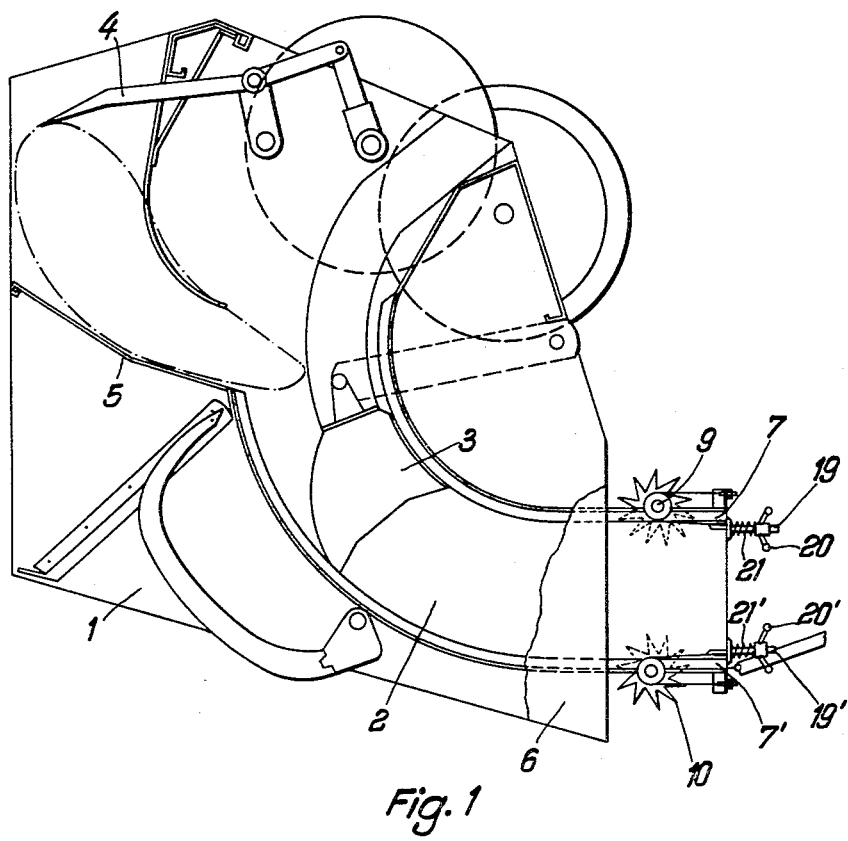
Fig. 1 is an elevation, partly in section, of a straw baler constructed in accordance with the invention disclosed in the aforementioned patent.

Referring now to Fig. 1 of the drawings, the baler or press 1 comprises essentially the baling chamber 2, the plunger 3, and feeder or packer arms 4, which convey the material over the feed plate 5 to the plunger. A bale-guide arrangement comprising angle-irons 7 and 7' carrying bearings for shafts 9 and 10 is mounted on and extends from the chamber side walls 6 and 6' at the end of the press. Brake wheels 11 and 12 are mounted on the upper brake shaft 9. The lower brake shaft 10 carries brake wheels 15 and 16. Brake pulleys 40 over which pass brake belts 41 are provided, one at the outer extremity of each brake shaft. Each brake belt 41 is connected to a tension screw 19 or 19' and is tensioned by a wing-nut 20 or 20'. A resilient braking effect is obtained on the brake shafts by means of the springs 21 and 21' located between the wing-nuts and supports 22.

In the embodiment of the invention shown in Figs. 1 to 3 each brake shaft can be braked individually.

The brake shafts 9 and 10 with the spur-wheels 11, 12 and 15, 16 are mounted at the outlet of the baling chamber of the baler or press 1. The brake shafts are mounted by means of levers 27, 27' and 28, 28', which can swivel about bearing pins 29 at the side walls 6, 6' of the press. The levers are double-armed levers with arms 30 and 31, and have hubs or bosses which extend through oblong openings 33 and 34 in the side walls of the press. The brake shafts can thus go through a movement about the bearing pins 29 into two end positions, which movement is restricted in both the upward and downward directions by the size of the said oblong openings. The lever arms 30 on each side of the baler or press 1 are connected to each other by a tensioned draw-spring 35 so that the brake shafts are constantly under spring-tension, and on the occurrence of a particularly strong pressure of a bale upon the spur-wheels, can yield upwardly or downwardly.

I claim:

1. In a baling machine for straw and like materials, in combination: a baling chamber having an upper side, a lower side, an outlet, and two spaced side walls each formed with two oblong openings; means for introducing the material into, and for advancing the same toward the outlet of said chamber; an upper and a lower transverse brake shaft adjacent to the upper and lower side, respectively, of said chamber in the proximity of said outlet, each shaft having two ends adjacent to the respective side walls of said chamber; brake wheels carried by each of said shafts and extending into the path of the material advancing in the chamber toward said outlet; a lever for each end of each of said shafts, each lever having a first arm swingably mounted on the respective side wall of said chamber, a second arm, and a boss at a point intermediate said arms, the boss being connected to an end of one of said shafts and extending into one of said openings; and resilient means connected to the second arm of each lever for constantly urging the shafts in a direction to move the wheels thereon further into said chamber, each boss being movable in one of said openings into a first end position by the respective resilient means and into a second end position by the material passing through said chamber and acting upon said wheels.

2. In a baling machine for straw and like materials, in combination: a baling chamber having two spaced side walls, an upper side, a lower side and an outlet; means for introducing the material into, and for advancing the same toward the outlet of said chamber; an upper and a lower transverse brake shaft adjacent to the upper and lower side, respectively, of said chamber in the proximity of said outlet, each shaft having two ends adjacent to the respective side walls of said chamber; brake wheels carried by each of said shafts and extending into the path of the material advancing in the chamber toward said outlet; a lever for each end of each of said shafts, each lever having a first arm swingably mounted on the respective side wall of said chamber, a second arm, said lever being connected to an end of each shaft at a point intermediate said arms; and resilient means connected to the second arm of each lever for constantly urging each of the shafts in a direction to move the wheels thereon further into said chamber, said resilient means comprising a first tension spring connecting the second arms of the levers mounted on one of said side walls and a second tension spring connecting the second arms of the levers mounted on the other of said side walls.

References Cited in the file of this patent

UNITED STATES PATENTS

| | | |
|---|---|---|
| 1,258,848 | Zachow | Mar. 12, 1918 |
| 2,478,012 | Raney | Aug. 2, 1949 |
| 2,771,024 | Maxwell | Nov. 20, 1956 |

FOREIGN PATENTS

| | | |
|---|---|---|
| 584,325 | Germany | Sept. 18, 1933 |
| 1,054,522 | France | Oct. 7, 1953 |